United States Patent [19]

Wallace et al.

[11] 3,906,953

[45] Sept. 23, 1975

[54] ENDOSCOPIC SURGICAL LASER SYSTEM

[75] Inventors: Robert A. Wallace, Wayland; Jan Pejchar, Maynard, both of Mass.

[73] Assignee: American Optical Corporation, Southbridge, Mass.

[22] Filed: May 23, 1974

[21] Appl. No.: 472,785

[52] U.S. Cl. .............................................. 128/303.1
[51] Int. Cl.² ........................................... A61B 17/36
[58] Field of Search ................ 128/303.1, 395, 6–9; 331/94.5

[56] References Cited
UNITED STATES PATENTS

| | | | |
|---|---|---|---|
| 3,659,613 | 5/1972 | Bredemeier | 128/395 |
| 3,769,963 | 11/1973 | Goldman et al. | 128/303.1 |
| 3,796,220 | 3/1974 | Bredemeier | 128/303.1 |
| 3,821,510 | 6/1974 | Muncheryan | 128/303.1 |

*Primary Examiner*—Lawrence W. Trapp
*Attorney, Agent, or Firm*—Joel Wall; William C. Nealon; H. R. Berkenstock, Jr.

[57] ABSTRACT

A surgical laser system for performing surgical operations upon a patient. The system includes a laser which could be a continuous wave laser which can be continuously energized if desired, and means for continuously illuminating the work site (patient tissue). There is further provided means for concurrent observation of the site and exposure of the site to the laser beam. Additionally, novel use of a light-transmissive pellicle provides a protective physical barrier between the inclement atmosphere associated with the surgical work site (moisture, mucus) and expensive optics including a beam splitter employed in the endoscope.

6 Claims, 2 Drawing Figures

ENDOSCOPIC SURGICAL LASER SYSTEM

BACKGROUND OF THE INVENTION

1. Field of the Invention

The present invention relates generally to a surgical laser system, and more particularly to means for delivering laser energy to a surgical work site and concurrently visibly illuminating the site. 2. Description of the Prior Art A purpose of the device described herein is to continuously deliver energy from a laser to relatively inaccessible locations while simultaneously, if desired, observing and continuously illuminating the target site. In particular, it is designed to direct the 10.6 micron wavelength beam of a $CO_2$ laser down a metal tube to sites within the body and thus to expose selected tissues to the laser radiation for excision or therapeutic purposes with or without conventional surgical intervention.

The present invention is an improvement over Bredemeier U.S. Pat. No. 3,659,613 issued May 2, 1972. Subject matter in this patent is incorporated herein by reference. In the drawings and particularly in FIGS. 6a and 7 of the Bredemeier patent, a complicated mechanical structure is disclosed for control of mutually exclusive operation of the laser and the work site illuminator. Furthermore, there are not described means for protecting from unwanted moisture, the vital optical elements in the endoscope.

Methods more previous to those of U.S. Pat. No. 3,659,613 involved the insertion of surgical instruments for cutting, burning, freezing or otherwise destroying tissue by physical contact. These older methods involve undesirable bleeding, and poor control of damage.

By employing the $CO_2$ laser beam for surgery, one takes advantage of an ability to direct and control the application of relatively large dosages of infra-red energy to sharply delineated sites. At the same time, however, it becomes necessary to allow for the limitations of currently available materials simultaneously to transmit radiation at wavelengths of between approximately 0.4 to 0.7 micron (visible) and 10.6 microns (infrared), handle the high power in the $CO_2$ laser beam substantially without waste of any part of the laser energy, and perform over a reasonable lifetime in a hospital environment. To overcome these conflicting requirements, it is essentially necessary to separate the path of the $CO_2$ laser beam and the visible beam either in time or in space. In U.S. Pat. No. 3,659,613, time separation is used, whereas in the present invention the paths of the $CO_2$ laser beam and of the visible beam are separated in space.

Typical advantages in using carbon dioxide or other far infrared energy lasers for a number of surgical interventions are lack of bleeding, accurate control of tissue removal and improved healing. A $CO_2$ laser, in addition to providing a high poor output, also has the advantage of having substantially all of its 10.6 micron radiation absorbed by body tissues; a condition not obtained when laser energy from other sources such as ruby, for example at 6,943 millimicrons is employed. Further information on the advantages of this type of surgery, particularly for relatively unaccessible body locations such as the larynx and the bronchi, are presented in the publication "Laser Surgery in the Aerodigestive Tract," by M. Stuart Strong, M.D., Geza A. Jako, M.D., Thomas Polanyi, Ph.D., and Robert A. Wallace, B.S.E.E., The American Journal of Surgery, 126:529-533, October 1973.

However, there are problems associated with this surgical laser prior art. For example, although the Bredemeier prior art patent discloses identical paths for the laser beam and the visible light, it requires a time sharing scheme, controlled by moving mechanical parts. Alignment, stability, repeatability, and other factors affecting overall system performance are adversely affected by moving mechanical parts. Furthermore, in the prior art only pulsed laser power could be used with high efficiency of delivery. By contrast, the present invention permits operation of the laser at zero frequency (DC) as well as at any other desired practical frequency of operation. And there are other advantages yet to be described which are associated with the use of the present invention.

The present invention thus provides a solution to these problems of the prior art for at least the reasons of not requiring moving mechanical parts, and permitting continuous exposure of the site to the laser beam with contemporaneous observation of the site.

SUMMARY OF THE INVENTION

The present invention relates to an endoscopic surgical laser system. The system includes a laser, preferably a $CO_2$ laser device, which is continuously energized, if desired, to provide a steady laser beam of controllable intensity. The laser beam is operatively associated with an endoscopic device or attachment which optically processes the beam, and exits the beam in a manner permitting surgical procedures to be performed therewith. Also employed are fiber optic means which continuously illuminate the work site impinged upon by the beam concurrently with surgical proceedings of the beam. Reflected visible light from the operating site is transmitted through the hollow tube of the endoscope to an eyepiece permitting an observer or surgeon to view and control the operation while it is taking place.

A further feature of the present invention relates to pellicle barrier means for protecting sensitive optical apparatus within the endoscope device or attachment, by preventing fluids such as blood, mucus, and water vapor from flowing from the surgical site to the optics. The pellicle transmits both laser beam and visible light, but prevents flow of moisture therethrough.

It is thus advantageous to use the present invention since there are no moving parts in the apparatus of the present invention; moving parts were needed for time sharing a substantially identical path for the laser beam and the visible light in the prior art. Also, the present invention delivers full laser power to the operating site irrespective of whether the laser operates in a DC mode or, at 120 hertz or at other reasonable power frequencies. Furthermore, the device of the present invention is inherently small and lighter because there is no need for the mask-mirror driving motor of the prior art patent. Moreover, many standard operating procedures for insertion and withdrawal of a particular specialized endoscope being employed are not altered or interfered with by use of the present invention. The laser accessory can be attached after the surgeon is satisfied with his site visualization and can be removed before the endoscope is removed.

It is thus an object of the invention to provide an improved endoscopic surgical laser system.

It is a further object of the present invention to provide a carbon dioxide ($CO_2$) laser accessory for surgical applications in which continuous wave laser energization and work site illumination can both function simultaneously and continuously.

It is yet another object of the present invention to provide means for delivering energy from a continuous wave $CO_2$ or other infrared laser through a long, narrow, rigid tube endoscope, typically a bronchoscope or a sigmoidoscope and for continuously exposing the site to the laser beam and contemporaneously observing the site.

Other advantages and objects of the present invention will be apparent to one of ordinary skill in the art after referring to a detailed description of the appended drawings wherein:

DESCRIPTION OF THE PREFERRED EMBODIMENTS

Figures 1, 2:
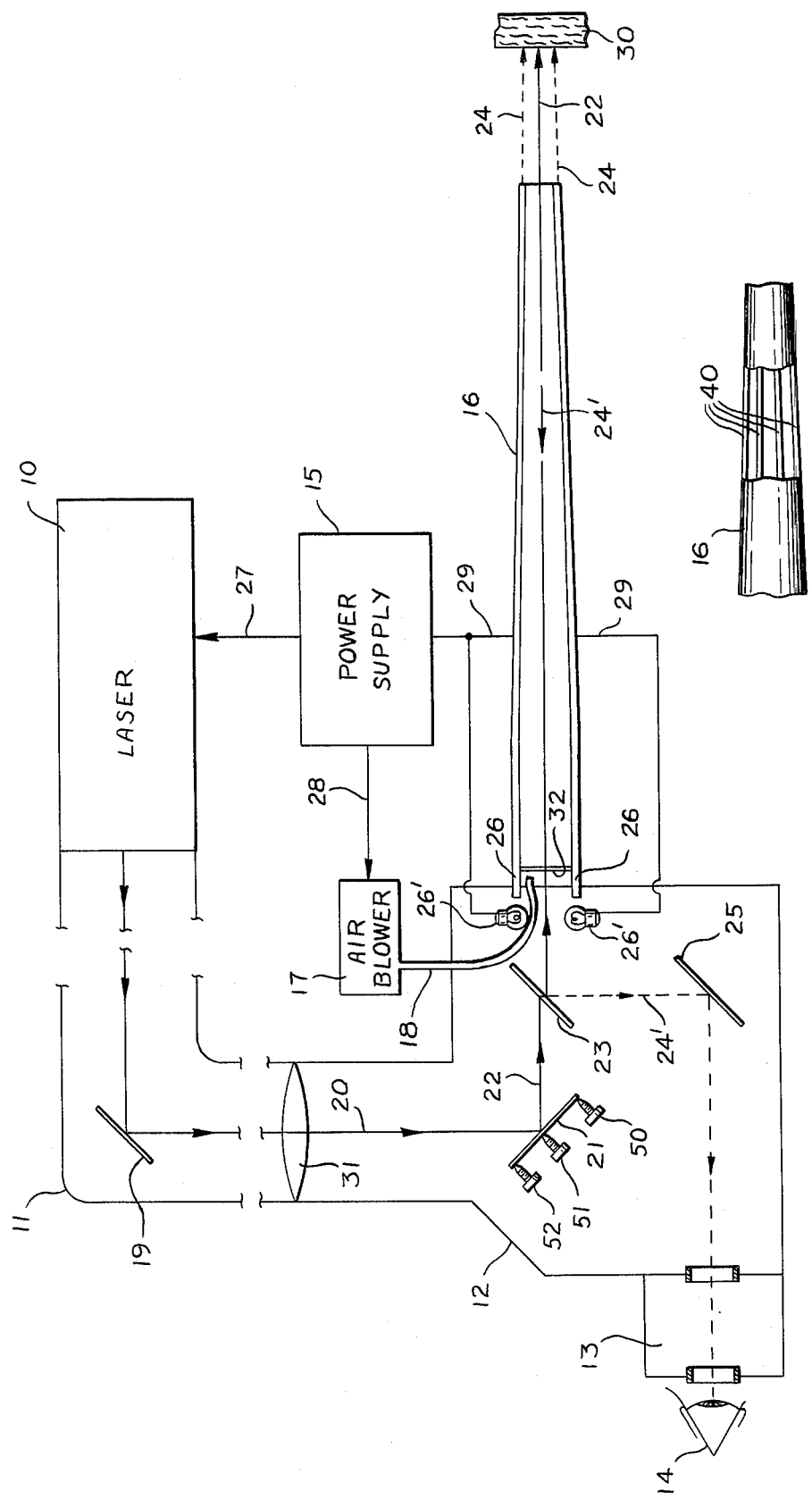
FIG. 1 depicts a schematic diagram of an illustrative embodiment of the present invention.
FIG. 2 depicts certain detail of FIG. 1.

In FIG. 1, laser 10, typically a $CO_2$ laser which provides laser energy at 10.6 microns wavelength, is energized by power supply 15 through electrical cable connection 27. Power supply 15 may be a DC or AC power supply since the present invention is designed to work with continuous laser beam energy as well as with pulsed laser beam energy. Laser beam 20 is depicted as being first reflected at mirror 19 contained within articulated arm 11. It should be understood that what is schematically shown in FIG. 1 and designated as articulated arm 11 is a representative diagram of an articulated arm (which comprises several mirrors, perhaps as many as seven, which reflect light or a laser beam from input to output thereof). An articulated arm uses successively reflecting mirrors, arranged so that the light beam reflected from the last mirror can be pointed in some desired direction. Since an articulated arm is old in the art, it is not necessary to describe in detail the operation and construction of an articulated arm in order to understand the present invention. Suffice it to say that laser beam 20 enters articulated arm 11 and mirror 19 is intended to represent a series of mirrors which finally exit the beam, and in this case exit the beam into endoscope attachment 12.

Endoscope attachment 12 is constructed in a manner similar to that disclosed in the incorporated-by-reference U.S. Pat. No. 3,659,613. Lens 31 represents required optics for receiving laser beam 20 at the input of attachment 12 and for transmitting beam 20 to mirror 21 which is substantially fully reflecting. By substantially fully reflecting, it is meant that mirror 21 is selected to have the characteristic necessary to substantially reflect all electromagnetic energy impinging thereon in the 10.6 micron wavelength region. Substantially fully reflected beam 22 is made to impinge upon beam splitter 23, is transmitted therethrough, and also through pellicle 32. (A pellicle is an optical element having the property of being extremely small in thickness, thereby providing certain desired transmissive characteristics with regard to a particular range of wavelengths employed.) The composition of the pellicle used in the present invention is a combination of polyethylene and acetate and is commercially available as "Stop and Shop Clear Plastic Wrap". (It is physically similar to, but not optically equivalent to other commercially available wraps.) The cost of the pellicle is minimal; if it is damaged or otherwise inadequate for its intended purpose, it can be removed and replaced easily. The amount of acetate in the pellicle of the present invention is a small amount, probably between 0 and 5%, and is used for strengthening the wrap. Other chemical compositions including coated windows having a NaCl or KCl composition, may possibly be employed, although the wrap chosen appears to work best.

Beam 22 passes through pellicle 32 which is transmissive at 10.6 microns (as well as at wavelengths of visible light), and the beam impinges upon patient tissue or work stie 30. At the point of impingement of the laser beam, the desired surgery is achieved. The intensity of the laser beam is controlled by adjusting certain outputs from supply 15, and the impingement of the laser beam is controlled by manual adjustment of set screws 50, 51, and 52 by the surgeon or operator involved. The set screws permit mirror 21 to be oriented in the desired vertical and horizontal directions, causing beam 22 to impinge as desired.

The optical elements used in endoscope attachment 12 must be kept clean of foreign materials at all times to permit good visualization of the operating site and to prevent absorption of the energy of the laser beam which would lead to damage or destruction of the optical elements. This is a particularly difficult task in view of the fact that, for example, in a bronchoscopic application, the flow of respiratory gases which are saturated with water vapor at body temperature flow very close to the optical element beam splitter 23 in FIG. 1. However, even worse than water vapor effects are the effects of mucus particles transported by the tidal flow of respiratory gases. Therefore, to overcome this problem, pellicle 32, which is transparent to laser radiation and visible light, is interposed between laser endoscope or exiting means 16 and endoscope attachment 12 and is air cooled as described below.

Air blower 17 is energized by power supply 15 through conductors 28. Air blower 17 is operatively connected to tube 18 which permits an air jet to be strategically directed upon pellicle 32 in a manner to cause cooling of the pellicle to maintain desired optical properties and to cause evaporation of fluids from the surface of the pellicle. The blower may be mounted in a manner to be physically unattached to the endoscope attachment and is of ordinary design; further detailed description thereof is not necessary for complete understanding of the invention.

Fiber optics 26 and illuminator means 26' are arranged to provide light illumination along fibers that are contained within the walls of bronchoscope or endoscope or beam exiting means 16. Referring to FIG. 2, fibers 40 are shown in a broken away portion of bronchoscope 16. Further detailed description of this type of fiber optic arrangement can be found in Pilling, U.S. Pat. No. 3,496,931, issued Feb. 24, 1970. This patent is also incorporated herein by reference. The illumination generated from lamp 26', which in turn is powered by power supply 15 through conductors 29, is transmitted through fibers 40 towards the specimen or site 30. Visible light 24 shown impinging upon site 30 is the light which illuminates the work site. Reflected visible light 24' is transmitted back through the hollow tube of endoscope 16 through pellicle 32, to beam splitter 23. The reflected visible light is reflected from beam splitter 23 as indicated in FIG. 1 and is directed to mirror 25. Reflected visible light 24' is once again reflected from mirror 25 which directs the reflected visible light to eyepiece 13, through which observer 14 observes the surgical procedure being performed on specimen or tissue 30.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An endoscopic surgical laser system comprising in combination: a laser device, means for energizing said device at a power frequency selected from a range of power frequencies including DC thereby generating a possibly continuous laser beam, an endoscope attachment, means for operatively applying said beam to said attachment, an endoscope for exiting said beam from said attachment and for performing surgery therewith, fiber optic means mounted within said endoscope for continuously illuminating with visible light a site being impinged upon by said beam, said endoscope including means for permitting reflected visible light from said site to reach said endoscope attachment, observer eyepiece means operatively associated with said endoscope attachment for receiving said reflected visible light, and means for controlling said beam.

2. A system as recited in claim 1 and wherein said endoscope attachment comprises first mirror means for receiving and substantially fully reflecting said beam and beam splitter means for receiving and fully transmitting said substantially fully reflected beam to said endoscope.

3. A system as recited in claim 2 includiing beam-wavelength and visible-wavelength transmissive pellicle means mounted in said exiting means transverse to said substantially fully reflected beam for providing a barrier to flow of fluids from said site to said endoscope attachment.

4. A system as recited in claim 3 including ventilation means for cooling said pellicle means and for evaporating said fluids from said pellicle means.

5. A system as recited in claim 4 and wherein said endoscope attachment includes second mirror means for receiving said reflected visible light from said beam splitter means and for reflecting said reflected visible light to said eyepiece means.

6. An endoscopic surgical laser system for operating on a patient, said system comprising a laser, means for energizing said laser thereby providing a laser beam, endoscopic means for manually controllably directing said beeam to a surgical work site of said patient, and means for continuously exposing said work site to said beam and concurrently observing said work site.

* * * * *